(12) United States Patent
Asano

(10) Patent No.: US 8,164,991 B2
(45) Date of Patent: Apr. 24, 2012

(54) OPTICAL DISK APPARATUS AND OPTICAL PICKUP DEVICE

(75) Inventor: Kenji Asano, Kakamigahara (JP)

(73) Assignees: Sanyo Electric Co., Ltd., Osaka (JP); Sanyo Optec Design Co., Ltd., Tokyo (JP)

(*) Notice: Subject to any disclaimer, the term of this patent is extended or adjusted under 35 U.S.C. 154(b) by 437 days.

(21) Appl. No.: 12/052,367

(22) Filed: Mar. 20, 2008

(65) Prior Publication Data

US 2008/0232204 A1    Sep. 25, 2008

(30) Foreign Application Priority Data

Mar. 23, 2007    (JP) .................................. 2007-77106

(51) Int. Cl.
*G11B 7/00* (2006.01)

(52) U.S. Cl. .............. 369/44.32; 369/112.01; 369/53.12

(58) Field of Classification Search .............. 369/53.12, 369/44.32, 44.23, 112.01
See application file for complete search history.

(56) References Cited

U.S. PATENT DOCUMENTS

| | | | | |
|---|---|---|---|---|
| 6,366,542 B1* | 4/2002 | Kojima et al. | ............. | 369/44.23 |
| 6,411,576 B1* | 6/2002 | Furukawa et al. | ......... | 369/53.19 |
| 6,411,587 B1* | 6/2002 | Arai et al. | ................. | 369/112.01 |
| 2002/0012313 A1* | 1/2002 | Kimura et al. | ............. | 369/112.08 |
| 2003/0147314 A1* | 8/2003 | Kondo et al. | .............. | 369/44.32 |
| 2003/0156514 A1* | 8/2003 | Suzuki | ........................ | 369/47.53 |
| 2003/0202437 A1* | 10/2003 | Yamada et al. | ............. | 369/44.29 |
| 2004/0264343 A1* | 12/2004 | Hendriks et al. | ......... | 369/112.01 |
| 2005/0254399 A1* | 11/2005 | Kimura | ..................... | 369/112.23 |
| 2006/0077790 A1* | 4/2006 | Noguchi | .................... | 369/44.23 |
| 2007/0159951 A1* | 7/2007 | Sagara | .......................... | 369/106 |

FOREIGN PATENT DOCUMENTS

| | | |
|---|---|---|
| CN | 1450535 A | 10/2003 |
| CN | 1577542 A | 2/2005 |
| JP | 8-153348 A | 6/1996 |
| JP | 10-106012 A | 4/1998 |
| JP | 2005-63629 A | 3/2005 |
| JP | 2006-064886 | 3/2006 |

OTHER PUBLICATIONS

Chinese Office Action for corresponding CN Application No. 200810087347.9, dated Apr. 21, 2010, pp. 1-24, China.

Japanese Office Action for corresponding JP Application No. 2007-077106, dated May 17, 2011, pp. 1-8.

* cited by examiner

*Primary Examiner* — Mohammad Ghayour
*Assistant Examiner* — Thomas Alunkal
(74) *Attorney, Agent, or Firm* — Ditthavong Mori & Steiner, P.C.

(57) ABSTRACT

A temperature sensor is disposed in an optical pickup to detect a temperature of an objective lens. An optical element (for example, a collimator lens) is driven according to a temperature change of the objective lens, which corrects deterioration of an optical characteristic of a laser beam passing through the objective lens. Good recording/reproduction is smoothly performed even if the optical characteristic of the objective lens is changed with the temperature change.

10 Claims, 14 Drawing Sheets

PARTIALLY SECTIONAL SIDE VIEW OF OPTICAL SYSTEM

TOP VIEW OF OPTICAL SYSTEM

REFERENCE TEMPERATURE CORRECTION TABLE

| TEMPERATURE | OPTIMUM STEP AMOUNT |
|---|---|
| T1 | S1 |
| T2 | S2 |
| T3 | S3 |
| ... | ... |
| Tn | Sn |

DIFFERENCE = ΔS

OPTIMUM TEMPERATURE CORRECTION TABLE

| TEMPERATURE | OPTIMUM STEP AMOUNT |
|---|---|
| T1 | S1 + ΔS |
| T2 | S2 + ΔS |
| T3 | S3 + ΔS |
| ... | ... |
| Tn | Sn + ΔS |

IN NORMAL OPERATION

PARTIALLY SECTIONAL SIDE VIEW OF OPTICAL SYSTEM

TOP VIEW OF OPTICAL SYSTEM

OPTICAL DISK APPARATUS AND OPTICAL PICKUP DEVICE

This application claims priority under 35 U.S.C. Section 119 of Japanese Patent Application No. 2007-077106 filed Mar. 23, 2007, entitled "OPTICAL DISK APPARATUS AND OPTICAL PICKUP DEVICE".

BACKGROUND OF THE INVENTION

1. Field of the Invention

The present invention relates to an optical disk apparatus and an optical pickup device mounted thereon, particularly to an optical disk apparatus in which an objective lens made of a resin material is suitably incorporated in an optical pickup device.

2. Description of the Related Art

Conventionally, the objective lens incorporated in the optical pickup device is made of a glass material. However, disadvantageously the objective lens made of the glass material is expensive, and a response characteristic of the optical pickup is hardly enhanced because the glass material has a large specific gravity. By contrast, when the objective lens is made of a resin material, cost of the objective lens can be largely reduced compared with the objective lens made of the glass material. Additionally because the resin material is about half the specific gravity of the glass material, the resin material can realize weight reduction and high-response of the objective lens.

At the same time, in the objective lens made of the resin material, an optical characteristic is easily changed depending on a temperature compared with the objective lens made of the glass material. When a numerical aperture of the objective lens is increased with increasing recording density of an optical disk, a change in optical characteristic of the objective lens has no small effect on a recording/reproduction characteristic. Particularly, in a recently-developed BD (Blu-Ray Disc), because a laser beam is collected onto the optical disk having a cover thickness of 1 mm using a high-NA objective lens whose numerical aperture is about 0.85, the slight change in optical characteristic of the objective lens has a large effect on quality of the recording/reproduction characteristic.

SUMMARY OF THE INVENTION

In view of the foregoing, an object of the present invention is to provide an optical disk apparatus and an optical pickup device, which can smoothly respond to the change in optical characteristic caused by the temperature change of the objective lens.

According to a first aspect of the present invention, an optical disk apparatus includes an optical pickup device which includes a laser source, an objective lens which causes a laser beam emitted from the laser source to converge onto an optical disk, a temperature sensor which detects a temperature of the objective lens, an optical element which corrects deterioration of an optical characteristic of the laser beam passing through the objective lens, and a photodetector which receives the laser beam reflected by the optical disk; and a control circuit which drives the optical element based on a detection signal from the temperature sensor.

In the first aspect of the present invention, the optical element is driven according to the temperature change of the objective lens, which corrects deterioration of the optical characteristic of the laser beam passing through the objective lens. Therefore, the smooth and good recording/reproduction operation can be realized even if the optical characteristic of the objective lens is changed according to the temperature change.

According to a second aspect of the present invention, an optical pickup device includes a laser source; an objective lens which causes a laser beam emitted from the laser source to converge onto an optical disk; a temperature sensor which detects a temperature of the objective lens; an optical element which corrects deterioration of an optical characteristic of the laser beam passing through the objective lens; and a photodetector which receives the laser beam reflected by the optical disk.

In the second aspect of the present invention, the temperature change of the objective lens is detected as needed by the temperature sensor. Therefore, the effect of the first aspect of the invention can be obtained by mounting the optical pickup device of the second aspect.

Other features of the first and second aspects of the present invention are described in the appended claims. The effects of other features will become apparent from the following description of embodiments.

The "objective lens" in the present invention corresponds to the first objective lens 108 of embodiments. The "optical element" in claims corresponds to configuration including the collimator lens 104 and the lens actuator 105 or configuration including the expander 112 and the lens actuator 113 of embodiments. The "control circuit" in claims corresponds to the servo circuit 12 and the controller 13 of embodiments. The function of the "functional portion" is realized as the function of the servo circuit 12.

BRIEF DESCRIPTION OF THE DRAWINGS

The above and further objects and novel features of the present invention will more fully appear from the following description of embodiments with reference to the accompanying drawings, in which.

However, the drawings are illustrated only by way of example without limiting the scope of the present invention.

DESCRIPTION OF THE PREFERRED EMBODIMENTS

Preferred embodiments of the present invention will be described below with reference to the drawings. In an embodiment, the present invention is applied to an optical disk apparatus which performs recording and reproduction to a BD, a CD (Compact Disc), and a DVD (Digital Versatile Disc).

Figure 1B:
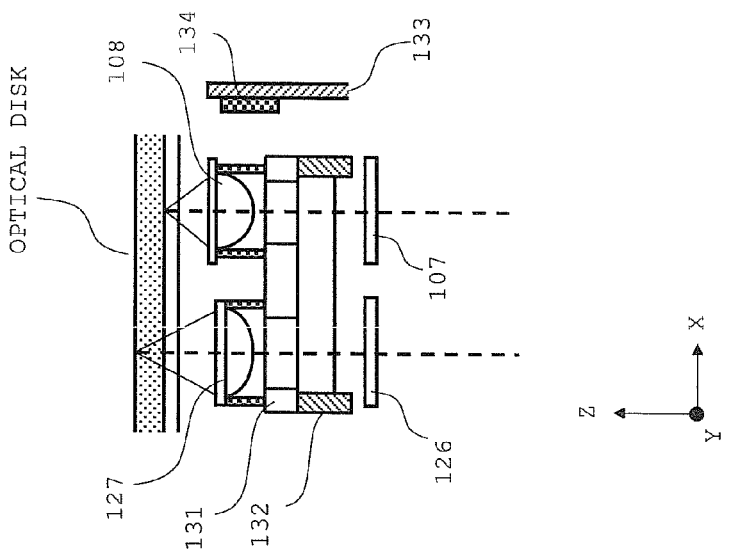
FIGS. 1A and 1B show an optical system of an optical pickup according to an embodiment of the present invention.
Figure 1A:
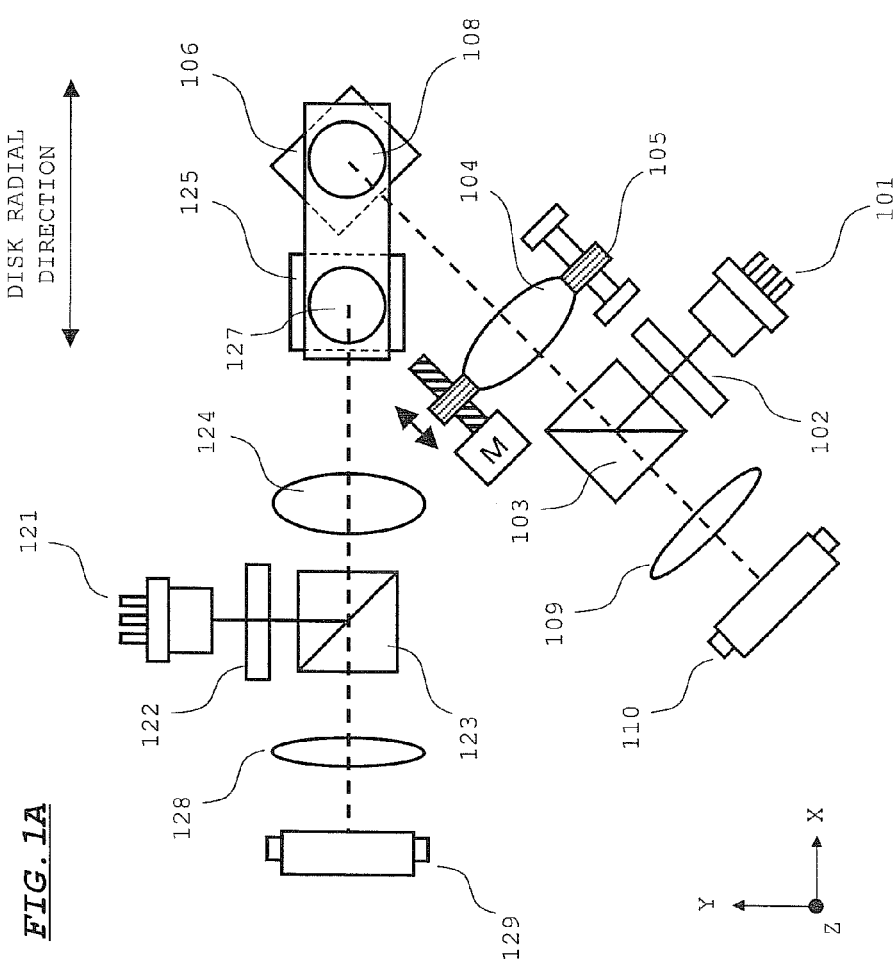

FIGS. 1A and 1B show an optical system of an optical pickup according to an embodiment of the present invention. FIG. 1A is a top view of the optical system, and FIG. 1B is a sectional side view showing a neighborhood of an objective lens actuator. The optical system is divided into a BD optical system and a CD/DVD optical system.

The BD optical system includes a semiconductor laser 101, a diffraction grating 102, a polarization beam splitter 103, a collimator lens 104, a lens actuator 105, an upwardly reflecting mirror 106, a quarter-wave plate 107, a first objective lens 108, an anamorphic lens 109, and a photodetector 110.

The semiconductor laser 101 emits a blue laser beam having a wavelength of about 400 nm. The diffraction grating 102 divides the laser beam emitted from the semiconductor laser 101 into three beams. The polarization beam splitter 103 reflects the laser beam incident from the side of the diffraction grating 102. The collimator lens 104 converts the laser beam reflected by the polarization beam splitter 103 into a parallel light. The lens actuator 105 drives the collimator lens 104 in an optical axis direction of the laser beam.

The collimator lens 104 and the lens actuator 105 act as aberration correction function. That is, as described later, the collimator lens 104 is driven by the lens actuator 105 according to the temperature change of the objective lens 108. The lens actuator 105 includes a stepping motor and a mechanism system, and lens actuator 105 drives the collimator lens 104 in response to a control signal from the servo circuit (described later).

The upwardly reflecting mirror 106 reflects the laser beam incident through the collimator lens 104 toward the first objective lens 108. The quarter-wave plate 107 converts the light reflected from the optical disk into linearly polarized light while converting the laser beam reflected by the upwardly reflecting mirror 106 into circularly polarized light. The linearly polarized light is orthogonal to polarization direction in which the laser beam is incident to the optical disk. Therefore, the laser beam reflected from the optical disk is transmitted through the polarization beam splitter 103 and introduced to the photodetector 110.

The first objective lens 108 is designed to cause the laser beam having the blue wavelength to converge properly onto a signal surface of BD. That is, the first objective lens 108 is designed to cause the laser beam having the blue wavelength to converge properly onto the signal surface through a substrate having a thickness of 0.1 mm. The first objective lens 108 is made of a resin material.

The anamorphic lens 109 causes the laser beam reflected from the optical disk to converge onto the photodetector 110. The anamorphic lens 109 includes a collective lens and a cylindrical lens, and the anamorphic lens 109 induces astigmatism into the light reflected from the optical disk.

The photodetector 110 has a sensor pattern to derive a reproduction RF signal, a focus error signal, and a tracking error signal from intensity distribution of the received laser beam. In the embodiment, an astigmatic method is adopted as a method for generating the focus error signal, and a DPP (Differential Push Pull) method is adopted as a method for generating the tracking error signal. The photodetector 110 has the sensor pattern to derive the focus error signal and the tracking error signal according to the methods.

The CD/DVD optical system includes a semiconductor laser 121, a diffraction grating 122, a polarization beam splitter 123, a collimator lens 124, an upwardly reflecting mirror 125, a quarter-wave plate 126, a second objective lens 127, an anamorphic lens 128, and a photodetector 129.

The semiconductor laser 121 includes a laser device in one CAN. The laser device emits an infrared laser beam having the wavelength of about 780 nm and a red laser beam having the wavelength of about 650 nm. The diffraction grating 122 divides the laser beam emitted from the semiconductor laser 121 into three beams. The polarization beam splitter 123 reflects the laser beam incident from the side of the diffraction grating 122. The collimator lens 124 converts the laser beam reflected by the polarization beam splitter 123 into the parallel light.

The upwardly reflecting mirror 125 reflects the laser beam incident through the collimator lens 124 toward the second objective lens 127. The quarter-wave plate 126 converts the light reflected from the optical disk into the linearly polarized light while converting the laser beam reflected by the upwardly reflecting mirror 125 into the circularly polarized light. The linearly polarized light is orthogonal to polarization direction in which the laser beam is incident to the optical disk. Therefore, the laser beam reflected from the optical disk is transmitted through the polarization beam splitter 123 and introduced to the photodetector 129.

The second objective lens 127 is designed to cause the laser beam having the infrared wavelength and the laser beam having the red wavelength to converge properly onto signal surfaces of CD and DVD respectively. That is, the second objective lens 127 is designed to cause the laser beam having the infrared wavelength to converge properly onto the signal surface through the substrate having the thickness of 1.2 mm and to cause the laser beam having the red wavelength to converge properly onto the signal surface through the substrate having the thickness of 0.6 mm. Similarly to the first objective lens 108, the second objective lens 127 is made of the resin material.

The anamorphic lens 128 causes the laser beam reflected from the optical disk to converge onto the photodetector 129. The anamorphic lens 128 includes a collective lens and a cylindrical lens, and the anamorphic lens 128 induces the astigmatism into the light reflected from the optical disk.

The photodetector 129 has a sensor pattern to derive the reproduction RF signal, the focus error signal, and the tracking error signal from an intensity distribution of the received laser beam. In the embodiment, the astigmatic method is adopted as the method for generating the focus error signal, and the DPP (Differential Push Pull) method is adopted as the method for generating the tracking error signal. The photodetector 129 has the sensor pattern to derive the focus error signal and the tracking error signal according to the methods.

The first objective lens 108 and the second objective lens 127 are mounted on a common holder 131. The holder 131 is driven in a focus direction and a tracking direction by an objective lens actuator 132. Accordingly, the first objective lens 108 and the second objective lens 127 are integrally driven by driving the holder 131.

The objective lens actuator 132 includes a coil and a magnetic circuit, and the coil is mounted on the holder 131. The first objective lens 108 and the second objective lens 127 are disposed so as to be aligned with a disk radial direction. At this point, in the two objective lenses, the first objective lens 108 having the smaller lens diameter is disposed on an inner circumferential side of the optical disk.

A circuit board 133 is disposed near the objective lens actuator 132, and the circuit board 133 supplies a servo signal to the coil mounted on the holder 131 through an electric supply line (not shown). A temperature sensor (thermistor) 134 is disposed in the circuit board 133 to detect a temperature around the first objective lens 108.

Figure 2:
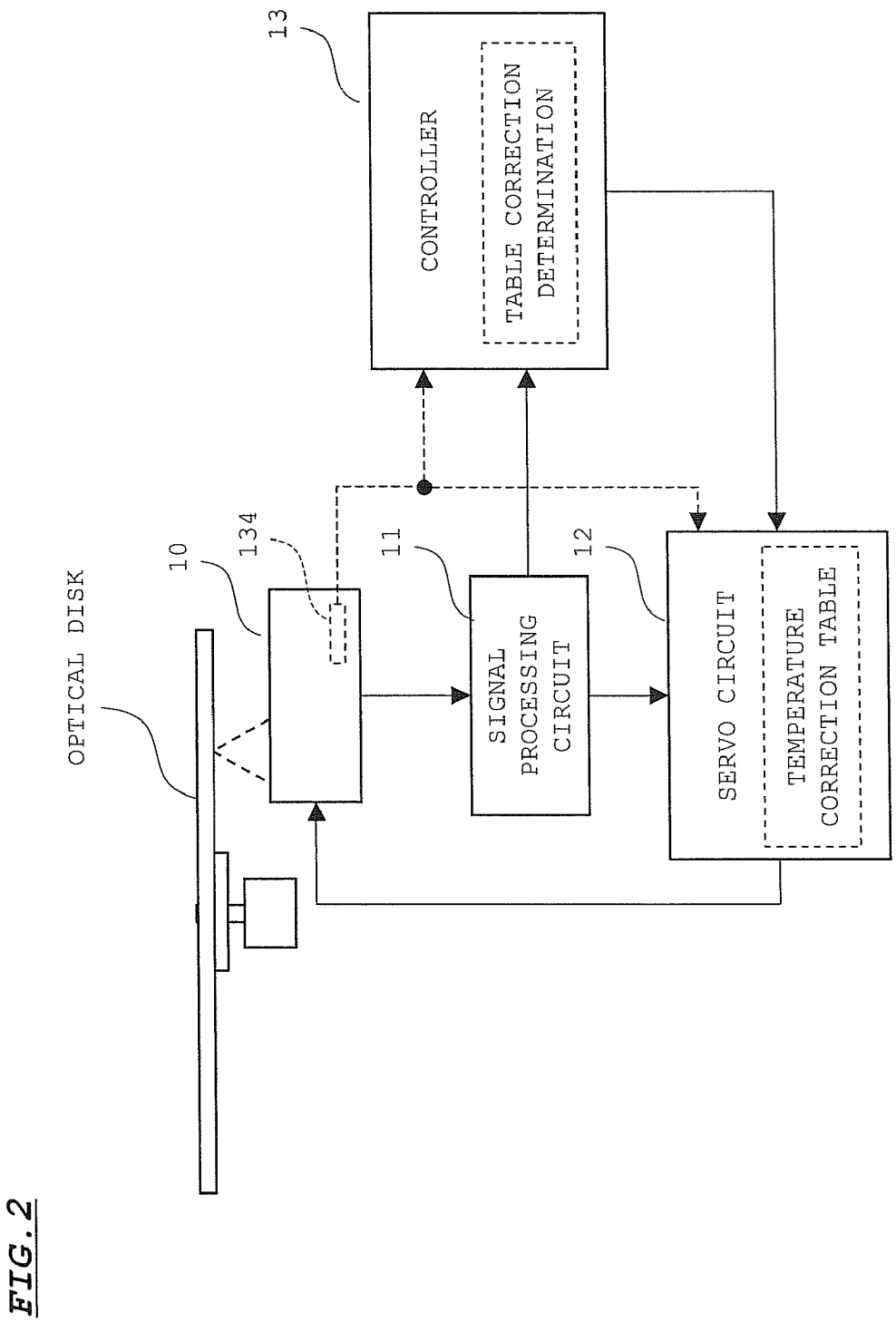
FIG. 2 shows a configuration of an optical disk apparatus according to an embodiment.

FIG. 2 shows a circuit configuration of an optical disk apparatus according to an embodiment of the present invention. FIG. 2 shows only a configuration concerning a servo system in the optical disk apparatus while a configuration concerning a recording/reproduction operation system is omitted.

As shown in FIG. 2, the optical disk apparatus includes an optical pickup 10, a signal processing circuit 11, a servo circuit 12, and a controller 13.

The optical pickup 10 includes the optical system shown in FIGS. 1A and 1B.

The signal processing circuit 11 processes signals from the photodetectors 110 and 129 disposed in the optical pickup 10, and the signal processing circuit 11 generates the reproduction RF signal, the focus error signal, and the tracking error signal. The focus error signal and the tracking error signal are outputted to the servo circuit 12. The reproduction RF signal is outputted to the servo circuit 12, the controller 13, and a reproduction processing circuit (not shown).

The servo circuit 12 generates a focus servo signal and a tracking servo signal from the focus error signal and the tracking error signal, inputted from the signal processing circuit 11, and the servo circuit 12 outputs the focus servo signal and the tracking servo signal to the objective lens actuator 132 of the optical pickup 10. During the aberration correction, the servo circuit 12 outputs a derive signal to the lens actuator 105 of the optical pickup 10 while referring to the reproduction RF signal.

The servo circuit 12 stores a temperature correction table (described later) in a built-in memory, and the servo circuit 12 updates the temperature correction table according to a command from the controller 13 during recording/reproduction for BD. The servo circuit 12 outputs the drive signal to the lens actuator 105 in response to a detection signal from the temperature sensor 134 disposed in the optical pickup 10 while referring to the updated temperature correction table. A method for updating the temperature correction table and drive control of the lens actuator 105 based on the temperature correction table are described in detail later.

The controller 13 controls each unit according to a predetermined control routine. During recording/reproduction for BD, the controller 13 monitors states of the detection signal from the temperature sensor 134 disposed in the optical pickup 10 and the reproduction RF signal inputted from the signal processing circuit 11, and the controller 13 appropriately issues a command to update the temperature correction table to the servo circuit 12. A process for determining whether or not the temperature correction table is updated is described later.

A temperature correction table updating method will be described with reference to FIGS. 3 and 4.

Figure 3:
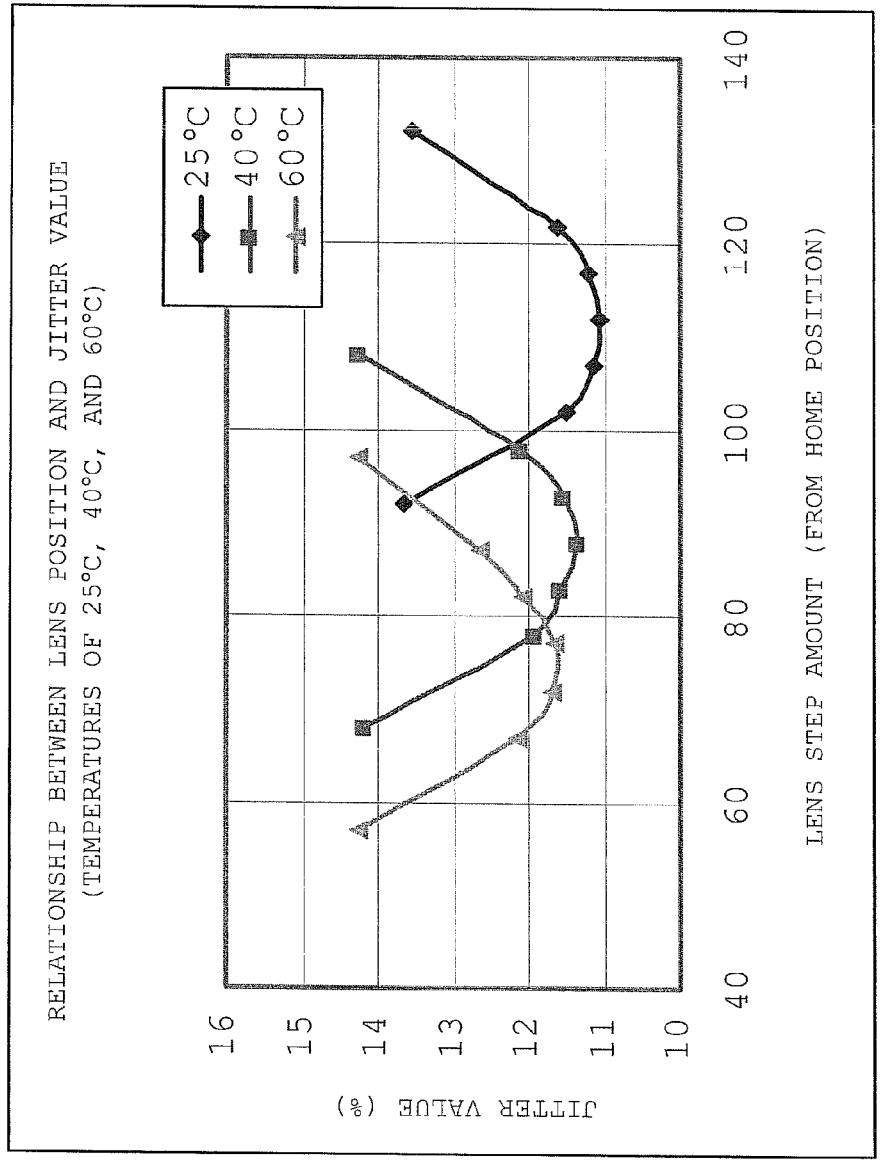
FIG. 3 is a view explaining a temperature correction table according to an embodiment.

FIG. 3 is measurement result showing a step amount of the collimator lens 104 and a jitter value of the reproduction RF signal. FIG. 3 shows the measurement result when the temperature of the first objective lens 108 is at 25° C., 40° C., and 60° C. As used herein, the "step amount" shall mean a step amount of the collimator lens 104 with respect to a home position. The step amount corresponds to the number of steps of the stepping motor constituting the lens actuator 105.

As shown in FIG. 3, when the best jitter value is acquired, the step amount (hereinafter referred to as "optimum step amount") of the collimator lens 104 depends on the temperature. This is because the optical characteristic (aberration characteristic) of the first objective lens 108 is changed according to the temperature. There is a linear relationship between the optimum step amount and the temperature. The linear relationship is defined as the temperature correction table. That is, in the temperature correction table, the optimum step amount is described while correlated with the temperature. At this point the temperature is not the actual temperature of the first objective lens 108, but a detection signal value of the temperature sensor 134 corresponding to the actual temperature (the same holds true for the following description).

A temperature correction table (hereinafter referred to as "reference temperature correction table") generally used in the same type optical pickup is stored in the built-in memory of the servo circuit 12. However, in the actual optical pickup, sometimes the optimum temperature correction table for the optical pickup is slightly shifted from the reference temperature correction table in the built-in memory due to a layout error in the optical system and the like. Therefore, in the actual operation, it is necessary that the collimator lens 104 be driven and controlled using the appropriately-updated temperature correction table (hereinafter referred to as "optimum temperature correction table").

Figure 4:
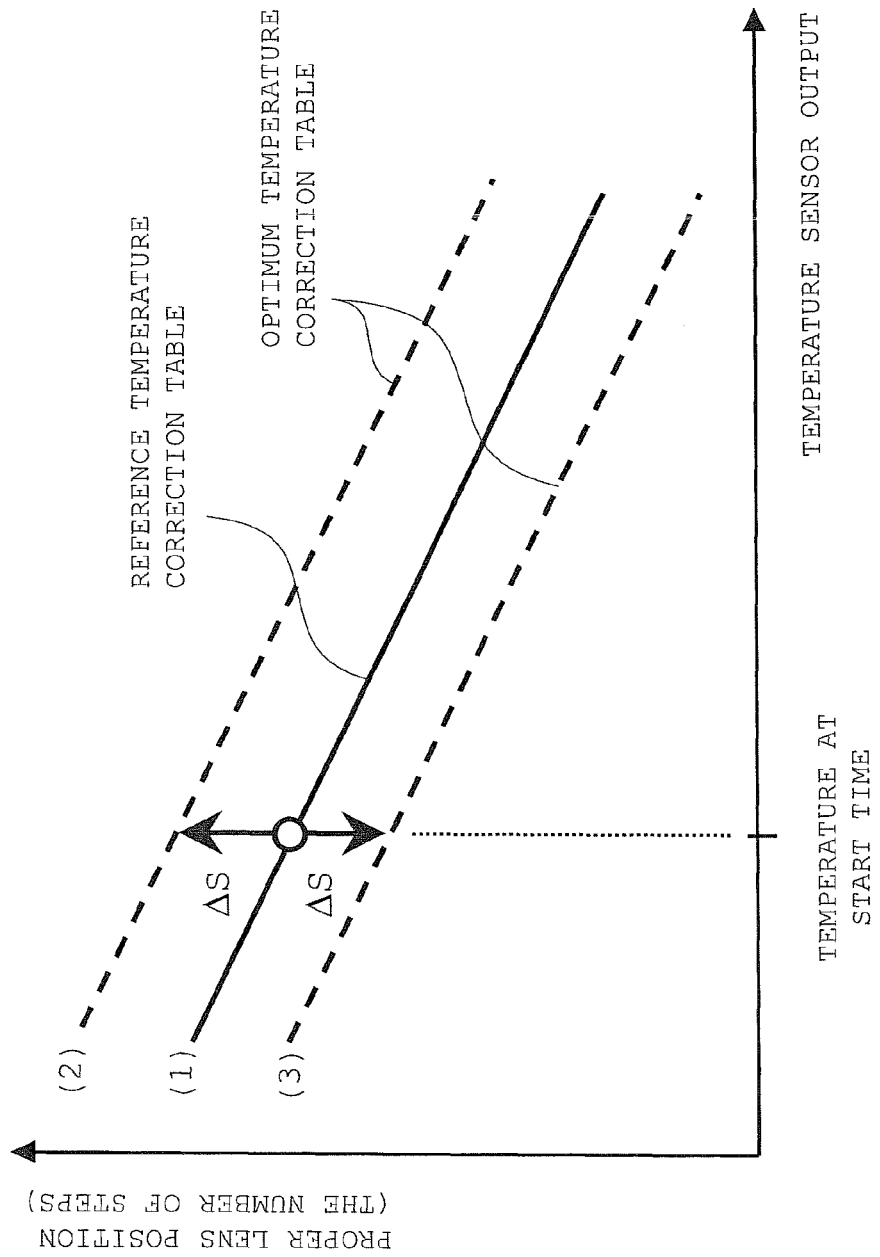
FIG. 4 shows a relationship between a reference temperature correction table and an optimum temperature correction table according to an embodiment.

FIG. 4 shows a contrast view of a linear function in the reference temperature correction table stored in the built-in memory and a linear function of the optimum temperature correction table in the actual optical pickup. In FIG. 4, the numeral (1) designates a linear function in the reference temperature correction table and the numerals (2) and (3) designate linear functions of the optimum temperature correction tables in the different optical pickups. FIG. 4 shows the linear function of the optimum temperature correction table on the assumption that a linear coefficient of the reference temperature correction table is equal to a linear coefficient of the optimum temperature correction table.

In the actual operation, it is necessary that the reference temperature correction table shown by the numeral (1) of in FIG. 4 be updated to the optimum reference temperature correction table shown by the numeral (2) or (3). The update is performed as follows.

In starting the update operation, the reproduction operation is actually performed to determine an optimum step amount (Sr). Then, a difference ΔS between the determined optimum step amount (Sr) and an optimum step amount (St) in the reference temperature correction table corresponding to the temperature in starting the update operation is determined. The step amount corresponding to each temperature of the reference temperature correction table is updated so as to correspond to the linear function in which the linear function of the reference temperature correction table is shifted by the difference ΔS. The update generates the optimum temperature correction table applied to the optical pickup. As described above, the update process is performed by the servo circuit 12 in response to the command of the controller 13.

Figures 5A, 5B:
FIGS. 5A and 5B show a configuration example of the reference temperature correction table and the optimum temperature correction table of the embodiment.

FIG. 5A shows a configuration of the reference temperature correction table. In the case of the difference ΔS between the optimum step amount (Sr) determined by the actual reproduction at the temperature in starting the update operation and the optimum step amount (St) in the reference temperature correction table at the temperature, the optimum temperature correction table is determined by adding the difference ΔS to the optimum step amount of each temperature of FIG. 5A (see FIG. 5B).

Figure 6:
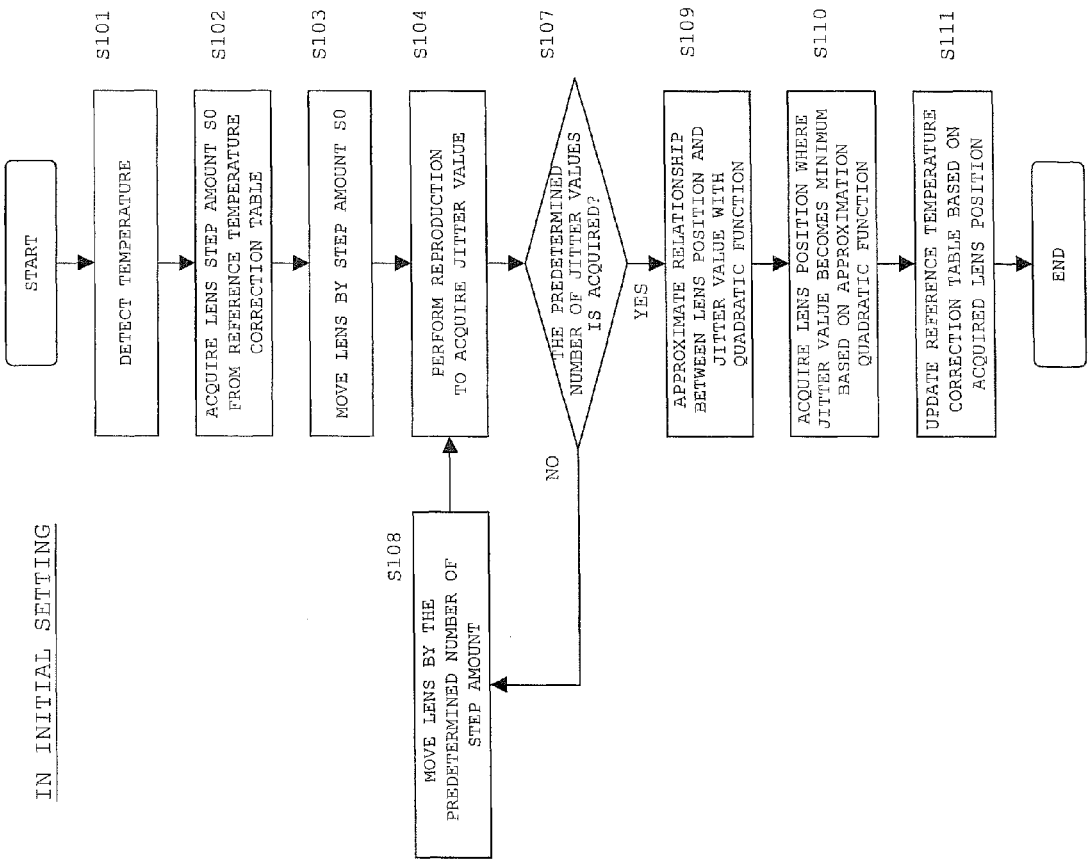
FIG. 6 shows a flowchart of a process for setting the optimum temperature correction table of the embodiment.

FIG. 6 is a flowchart showing an example of the process for updating the temperature correction table in starting the actual operation (example of the process for initially setting the optimum temperature correction table).

In the process of FIG. 6, first a temperature of the first objective lens 108 is detected in starting the process (S101). Then, an optimum step amount S0 corresponding to the detected temperature is acquired from the reference temperature correction table (S102), and the collimator lens 104 is moved from the home position by the optimum step amount S0 (S103). Then, the reproduction is performed to the disk (BD), and the jitter value of the reproduction RF signal in the reproduction operation (S104) is acquired.

When the jitter value is acquired, it is determined whether or not the predetermined number of jitter values is acquired (for example, three times) (S107). If "NO" in the determination (NO in S107), the collimator lens 104 is moved in a predetermined direction by a certain step amount (S108), and the reproduction is performed again to acquire the jitter value (S104). Then, the drive of the collimator lens 104 and the acquisition of the jitter value are repeated until the predetermined number of jitter values is acquired (S104, S107, and S108).

When the predetermined number of jitter values is acquired, the relationship between the step amount and the jitter value shown in FIG. 3 is approximated with a quadratic function based on the acquired jitter value and the step amount of the collimator lens 104 corresponding to each jitter value (S109). The step amount (optimum step amount) which minimizes the jitter value is acquired based on the approximation quadratic function (S110), and the reference temperature correction table is updated based on the acquired optimum step amount as described above with reference to FIG. 4 and FIGS. 5A and 5B (S111). Thus, the optimum temperature correction table is acquired to end the temperature correction table update (optimum temperature correction table initial setting process).

In the flowchart of FIG. 6, the relationship between the step amount and the jitter value is approximated with the quadratic function after the predetermined number of jitter values is acquired, and the optimum step amount is determined at the temperature in the update based on the approximation quadratic function. Alternatively, the optimum step amount may be acquired by another method. For example, the drive of the collimator lens 104 is caused to converge in the direction in which the jitter value becomes the minimum, and the step amount in the convergence may be acquired as the optimum step amount of the collimator lens 104. Furthermore, the drive of the collimator lens 104 is caused to converge in the direction in which the reproduction RF signal becomes the maximum, and the step amount in the convergence may be acquired as the optimum step amount of the collimator lens 104.

When the optimum temperature correction table is initially set, the recording/reproduction operation is performed to the disk (BD) using the optimum temperature correction table. However, because the optimum temperature correction table is estimated based on the temperature in the initial setting, when the temperature of the first objective lens 108 is changed with the advance of the recording/reproduction operation, the initially-set optimum temperature correction table is possibly shifted from the proper optimum temperature correction table at that temperature. Therefore, in the subsequent recording/reproduction operation, a confirmation whether or not the optimum temperature correction table is proper is made as appropriate to update the proper temperature correction table at the temperature at the time.

Figure 7:
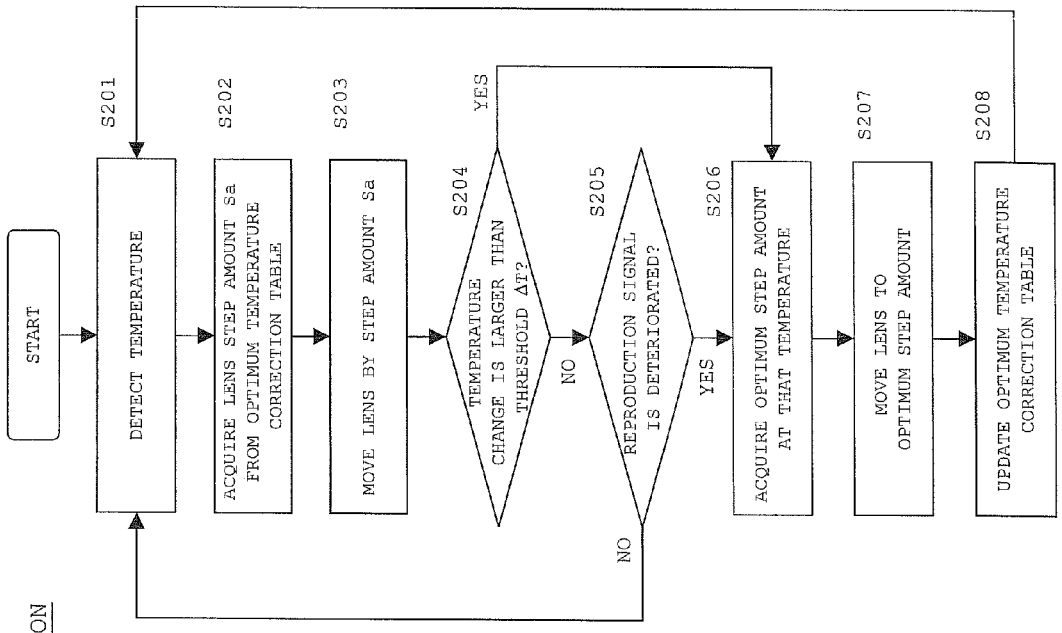
FIG. 7 shows a flowchart of a process for controlling a collimator lens according to an embodiment.

FIG. 7 is a flowchart showing drive control of the collimator lens 104 when the recording/reproduction operation is performed after the optimum temperature correction table is initially set.

When the recording operation or the reproduction operation is performed to the disk (BD), the servo circuit 12 detects the temperature as needed (S201), an optimum step amount Sa corresponding to the detected temperature is acquired from the optimum temperature correction table (S202). The collimator lens 104 is driven such that the optimum step amount Sa is achieved (S203).

In tandem with the drive of the collimator lens 104, the controller 13 monitors a difference between the current temperature and the temperature at the last time the optimum temperature correction table is updated (S204), and the controller 13 simultaneously monitors the quality of reproduction signal during the recording/reproduction operation (S205). When the temperature difference exceeds a threshold ΔT (YES in S204), or when the quality (for example, jitter value) of the reproduction signal is deteriorated lower than a predetermined level (YES in S205), the controller 13 issues a command to re-update the optimum temperature correction table to the servo circuit 12.

In response to the re-update command, the servo circuit 12 utilizes a spare time of the recording/reproduction operation to re-update the optimum temperature correction table.

Specifically, the reproduction is performed at a position of the collimator lens 104 at that time to acquire the jitter value. Then, the collimator lens 104 is moved in the forward and backward direction by a predetermined amount, and the jitter value is acquired at each movement position. As with the case of FIG. 6, the relationship between the step amount and the jitter value is approximated with the quadratic function based on the plurality of acquired jitter values, and the step amount in which the jitter value becomes the minimum is acquired as the optimum step amount based on the approximation quadratic function (S206). As with the case of FIG. 6, the optimum step amount may be acquired by other methods.

The servo circuit 12 moves the collimator lens 104 to the acquired optimum step amount (S207). On the basis of the optimum step amount acquired in step S206, the reference temperature correction table is updated to obtain the optimum temperature correction table as described above with reference to FIG. 4 and FIGS. 5A and 5B. Thus, the re-update of the optimum temperature correction table is ended (S208).

When the collimator lens 104 is moved to the optimum step amount to re-update the optimum temperature correction table, the servo circuit 12 performs the processes of the steps S201 and S202 to sequentially displace the collimator lens 104 based on the re-updated optimum temperature correction table. When the temperature difference relative to the previous update exceeds the threshold ΔT (YES in S204), or when the quality (for example, jitter value) of the reproduction signal is deteriorated lower than the predetermined level (YES in S205), the controller 13 issues the command to re-update the optimum temperature correction table to the servo circuit 12, and the optimum temperature correction table is updated again.

Figure 8:
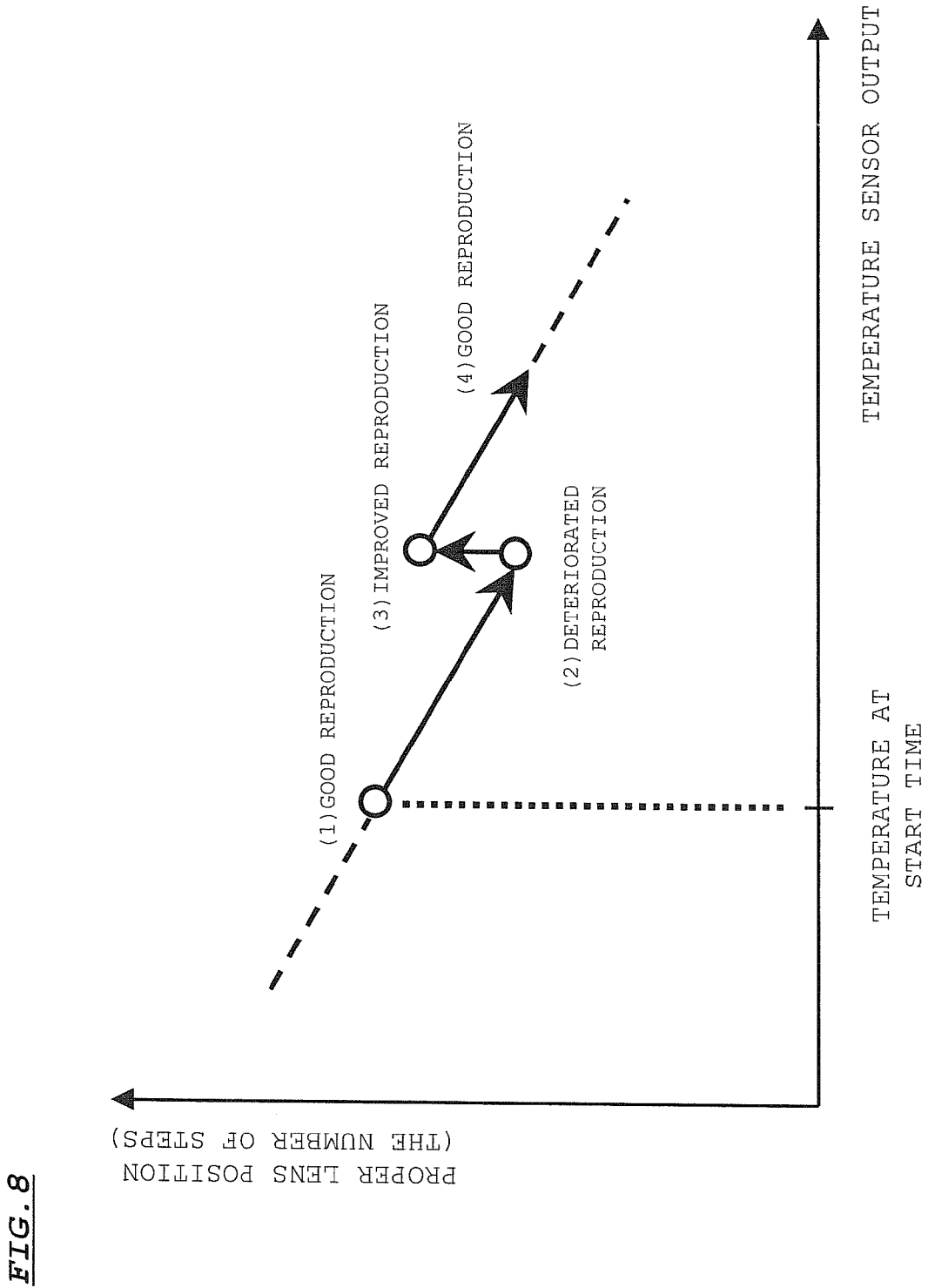
FIG. 8 shows a drive example of the collimator lens of the embodiment.

FIG. 8 shows a drive state of the collimator lens 104 during the recording/reproduction.

When the optimum temperature correction table is initially set to start the recording/reproduction operation at the time shown by the numeral (1) of FIG. 8, the step amount of the collimator lens 104 is changed with the temperature change of the first objective lens 108 based on the optimum temperature correction table. In tandem with the control, it is monitored whether or not the difference between the temperature of the first objective lens 108 at the time (1) of FIG. 8 and the current temperature of the first objective lens 108 exceeds the threshold ΔT, and it is monitored whether or not the quality of the reproduction RF signal is deteriorated lower than the predetermined level.

When the reproduction RF signal is deteriorated lower than the predetermined level at the time (2) of FIG. 8, the optimum temperature correction table is updated, and the collimator lens 104 is simultaneously displaced to the optimum step amount. Therefore, the quality of the reproduction RF signal is improved at the time (3) of FIG. 8. Then, the step amount of the collimator lens 104 is changed with the temperature change of the first objective lens 108 based on the updated optimum temperature correction table. Therefore, the good recording/reproduction operation is performed at the time shown by the numeral (4) of FIG. 8.

Thus, in the embodiment, the collimator lens 104 is moved to the position where the quality of the good reproduction RF signal is acquired with the temperature change of the first objective lens 108, so that the good recording/reproduction operation can be realized. Additionally, the objective lens made of the resin material is used as the first objective lens 108, so that the significant cost reduction, weight reduction, and high response can be achieved.

[Modification of Table Update Process]

In the process of step S208 of FIG. 7, the linear function defining the relationship between the optimum step amount and the temperature is reset by the method shown in FIG. 4, and the optimum temperature correction table is updated based on the reset linear function. That is, the linear function is shifted in the step amount direction shown in FIG. 4 without changing the coefficient (gradient) of the linear function, whereby the optimum temperature correction table is updated so as to be matched with the linear function corresponding to the temperature at that time.

However, in the reference temperature correction table, because the coefficient (gradient) of the linear function is generally set for the same type of optical pickup, depending on the optical pickup, the set coefficient (gradient) is possibly shifted from the proper coefficient (gradient) due to temperature or the layout error of the optical system. Accordingly, in some cases, preferably the coefficient (gradient) of the linear function is adjusted instead of the process in step S208, and the optimum temperature correction table is updated with the linear function according to the adjusted coefficient (gradient).

Figure 9:
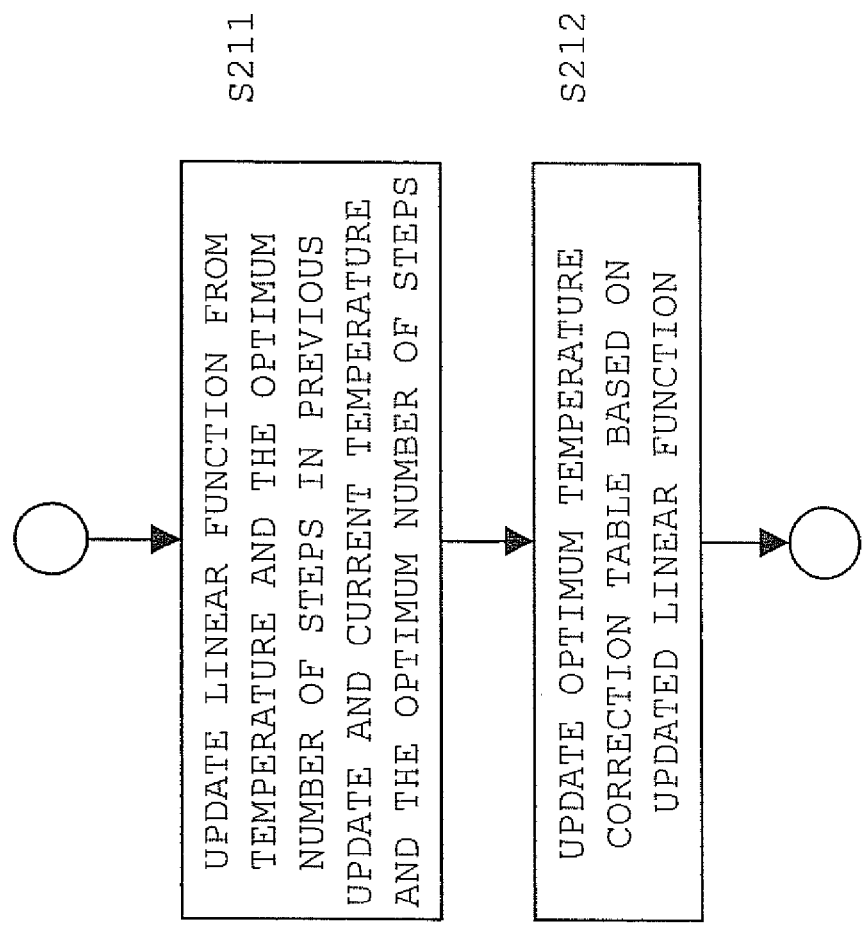
FIG. 9 shows a modification of process for setting the optimum temperature correction table of the embodiment.

FIG. 9 shows an example of the process in this case. In the process of FIG. 9, the linear function defining the relationship between the optimum step amount and the temperature is updated so as to pass through two points, i.e., the point defining the temperature and optimum step amount in the previous update and the point defining the temperature and optimum step amount acquired in the step S206 (S211). In the updated linear function, the coefficient (gradient) is made appropriate with respect to the linear function to which the update is not performed yet. Then, the optimum temperature correction table is updated based on the updated linear function (S212).

Figure 10:
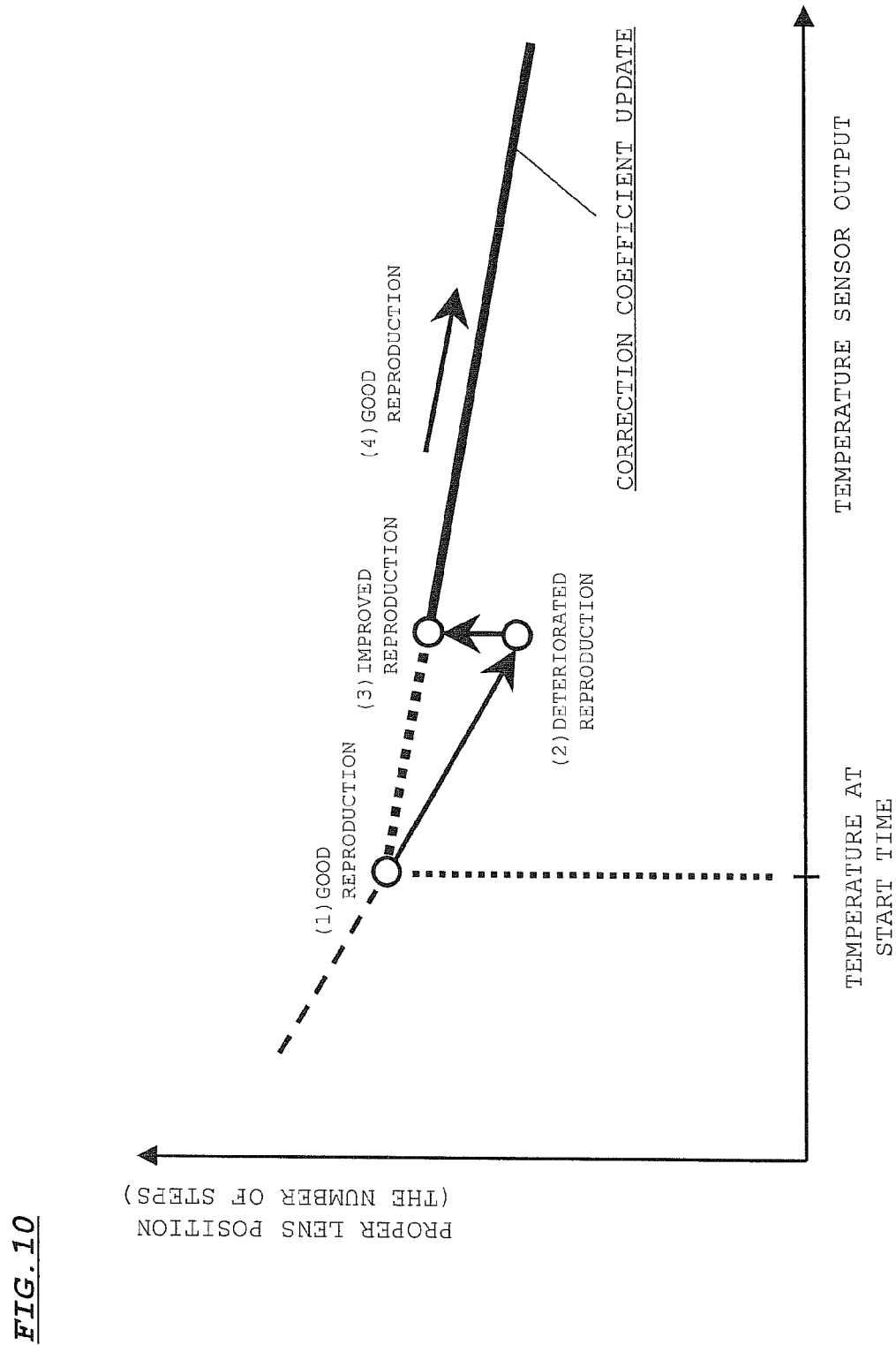
FIG. 10 shows a drive example of the collimator lens of the modification shown in FIG. 9.

FIG. 10 shows the drive state of the collimator lens 104 when the process of FIG. 9 is applied.

When the optimum temperature correction table is initially set to start the recording/reproduction operation at the time (1) of FIG. 10, the step amount of the collimator lens 104 is changed with the temperature change of the first objective lens 108 based on the optimum temperature correction table. In tandem with the control, it is monitored whether or not the difference between the temperature of the first objective lens 108 at the time (1) of FIG. 10 and the current temperature of the first objective lens 108 exceeds the threshold ΔT, and it is monitored whether or not the quality of the reproduction RF signal is deteriorated lower than the predetermined level.

When the reproduction RF signal is deteriorated lower than the predetermined level at the time (2) of FIG. 10, similarly to the embodiment, the optimum step amount in which the quality (for example, jitter value) of the reproduction RF signal becomes the best is acquired at the time (3) of FIG. 10, and the collimator lens 104 is moved to the optimum step amount. Therefore, the quality of the reproduction RF signal is improved at the time (3) of FIG. 10.

The optimum temperature correction table re-update process is performed in tandem to the process. Unlike the embodiment, a linear function (shown by a bold dotted line and a solid line in FIG. 10) passing through a coordinate point indicating the temperature and optimum step amount at the time (2) of FIG. 10 and a coordinate point indicating the temperature and optimum step amount in starting the recording/reproduction operation (the time (1) of FIG. 10) is determined in the case where the process of FIG. 9 is adopted. Then, the optimum temperature correction table is updated based on the determined linear function.

The step amount of the collimator lens 104 is changed with the temperature change of the first objective lens 108 based on the updated optimum temperature correction table. Therefore, the good recording/reproduction operation is performed at the time (4) of FIG. 10.

While the embodiment of the present invention is described above, the embodiment of the present invention can further be changed and modified as follows.

(A) Reference Temperature Correction Table

In the embodiment, the reference temperature correction table shown in FIG. 5A is retained by the servo circuit 12. Alternatively, the coefficient (gradient) of the linear function defining the temperature and optimum step amount may be retained by the servo circuit 12.

In this case, the servo circuit 12 performs the following process as the process for initially setting the optimum temperature correction table. Similarly the optimum step amount is determined at the temperature in the initial setting. Then, the linear function passing through the coordinate point defining the temperature and optimum step amount in the initial setting is set based on the coefficient (gradient) stored in the built-in memory. The optimum step amount corresponding to each temperature of the optimum temperature correction table is set so as to be matched with the linear function.

Figure 11:
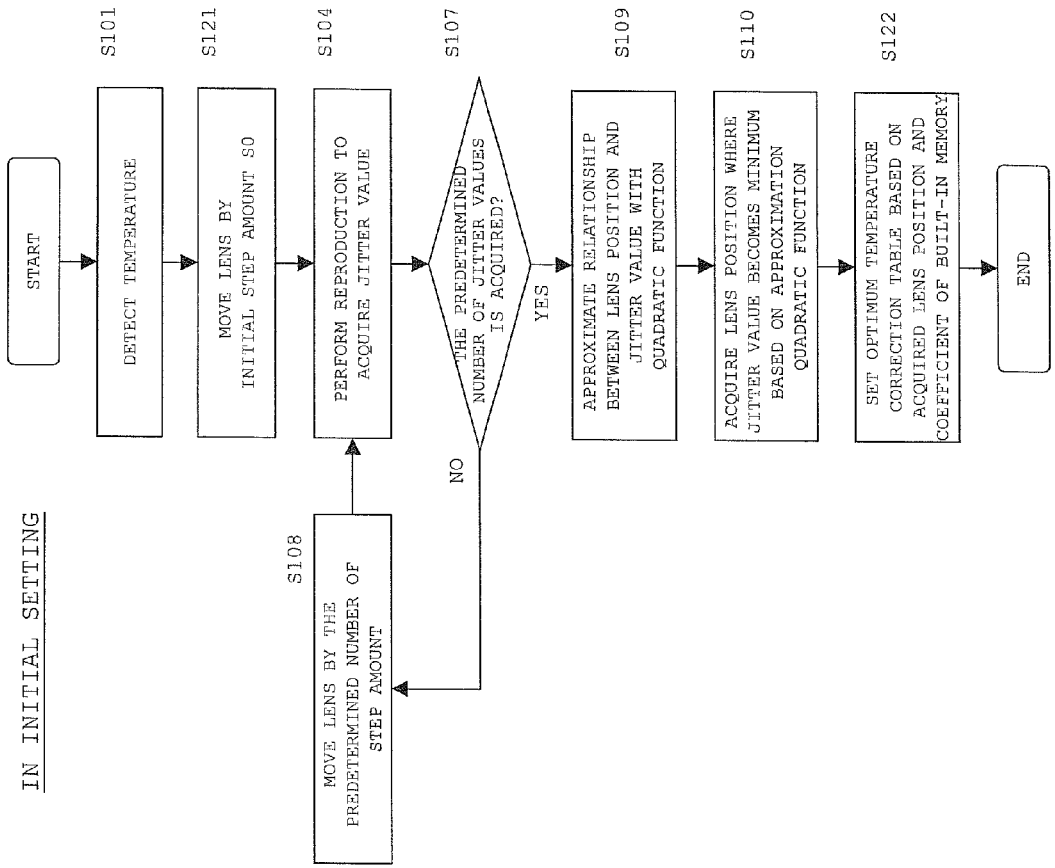
FIG. 11 shows a modification of the process for setting the optimum temperature correction table of the embodiment.

FIG. 11 is a flowchart showing the optimum temperature correction table initial setting process when the linear coefficient (gradient) is used. In steps of FIG. 11, the same step as the flowchart of FIG. 6 is designated by the same numeral.

In the process shown by the flowchart of FIG. 11, the temperature of the first objective lens 108 is detected in starting the process (S101). The collimator lens 104 is moved from the home position by a predetermined step amount (S121). Then, the reproduction is performed to the disk (BD) and the jitter value of the reproduction RF signal is acquired in the reproduction operation (S104). Then, similarly to the case of FIG. 6, the drive of the collimator lens 104 and the acquisition of the jitter value are repeated the predetermined times (S104, S107, and S108). The relationship between the step amount and the jitter value, shown in FIG. 3, is approximated with the quadratic function based on the acquired jitter value and the step amount of the collimator lens 104 corresponding to each jitter value (S109), and the optimum step amount in which the jitter value becomes the minimum is acquired based on the approximation quadratic function (S110).

When the optimum step amount is acquired, the linear coefficient (gradient) is read from the built-in memory to set the linear function passing through the coordinate point defining the optimum step amount acquired in step S110 and the temperature detected in the step. The optimum step amount corresponding to each temperature of the optimum temperature correction table is set so as to be matched with the linear function (S122).

Thus, in the case where the linear coefficient (gradient) is stored in the built-in memory, the optimum temperature correction table is updated in step S208 of FIG. 7 like the flowchart of FIG. 11. Alternatively, the process in step S208 may be replaced by the process described with reference to FIG. 10.

In the case where the linear coefficient (gradient) is stored in the built-in memory, the optimum step amount to the temperature in the actual operation may be determined from the linear coefficient (gradient), the optimum step amount acquired in step S110, and the temperature acquired in step S101 through step-by-step computation with no use of the optimum temperature correction table.

(B) Setting of Time Control Mode

During a predetermined period after starting the recording/reproduction operation, due to a large fluctuation in temperature of the first objective lens 108, an error is easily generated between the temperature detected by the temperature sensor 134 and the actual temperature of the first objective lens 108. Therefore, when the process of FIG. 7 is performed based on the detection signal from the temperature sensor 134 during the period, possibly the proper drive control of the collimator lens 104 cannot be realized according to the change in optical characteristic of the first objective lens 108.

Accordingly, during a period until the temperature of the first objective lens 108 is stabilized since the recording/reproduction operation is started, the drive control of the collimator lens 104 is performed more properly based on the elapsed time since the recording/reproduction operation is started.

In this case (referred to as time control mode), the temperature characteristic of the first objective lens 108 to the elapsed time is retained, which allows the collimator lens 104 to be controlled using the elapsed time. That is, the servo circuit 12 predicts the actual temperature of the first objective lens 108 in each elapsed time based on the temperature characteristic. Then, the optimum step amount of the collimator lens 104 is acquired based on the predicted temperature and the optimum temperature correction table, and the drive control of the collimator lens 104 is performed based on the acquired optimum step amount.

Figure 12:
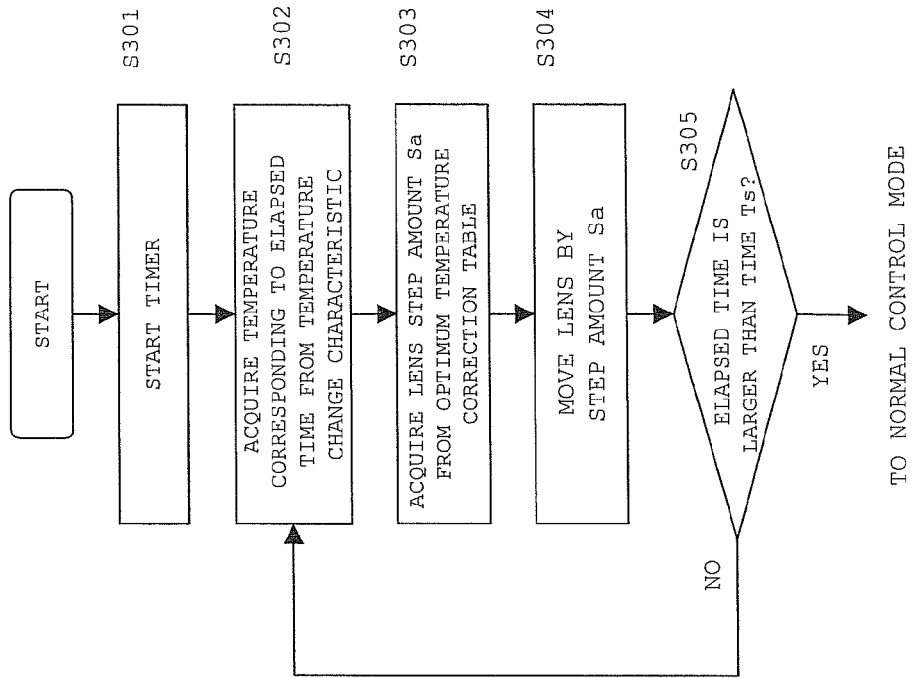
FIG. 12 is a flowchart of a process in a time control mode according to an embodiment of the present invention.

FIG. 12 shows the flowchart of the time control mode.

When the recording/reproduction operation is started, a built-in timer is started up (S301) and the temperature corresponding to the elapsed time measured by the timer is acquired based on the temperature change characteristic stored in the servo circuit 12 (S302). The optimum step amount Sa corresponding to the acquired temperature is acquired from the optimum temperature correction table (S303) and the collimator lens 104 is moved to the acquired optimum step amount Sa (S304).

The processes in steps S302 to S304 are repeated until the elapsed time measured by the timer reaches a predetermined time Ts (S305). When the elapsed time reaches the predetermined time Ts (YES in S305), the time control mode including steps S301 to S305 is ended, and the flow goes to the normal control mode shown in FIG. 7.

(C) Switch of Temperature Correction Table

Magnitude of the aberration generated by the first objective lens 108 is changed according to a wavelength of the laser beam. That is, when a fluctuation in wavelength is generated in the laser beam emitted from the semiconductor laser 101, a level of the aberration generated by the first objective lens 108 varies according to the fluctuation in wavelength. It is known that generally the fluctuation in wavelength of the semiconductor laser is generated according to a change in emission power. For example, in the semiconductor laser emitting the laser beam having the blue wavelength, the wavelength of the laser beam is changed in a range of 2 to 3 nm when the emission power is changed by 100 mW.

Accordingly, in the embodiment, the magnitude of the aberration generated by the first objective lens 108 is changed when the emission power of the semiconductor laser 101 is changed between the recording power and the reproduction power. In the case where a double-speed recording/reproduction mode exists, because the emission power from the semiconductor laser 101 is changed according to a double-speed level, the magnitude of the aberration generated by the first objective lens 108 is also changed in each double-speed mode.

From this viewpoint, preferably the optimum temperature correction table of the embodiment is individually prepared according to the recording/reproduction and each double-speed mode and the optimum temperature correction table is appropriately switched according to each operation mode. The reference temperature correction table is previously retained in each operation mode by the servo circuit 12, and the reference temperature correction table used in FIGS. 6 and 7 is switched in each operation mode. That is, the reference temperature correction table for the reproduction is used during the reproduction, and the reference temperature correction table for the double-speed recording is used during the double-speed recording, and the optimum temperature correction table is set through the process of the embodiment of FIG. 6. During the reproduction operation or double-speed recording operation, the process of FIG. 7 is performed using each set optimum temperature correction table, and the drive control of the collimator lens 104 is performed while the optimum temperature correction table is appropriately updated.

Figure 13:
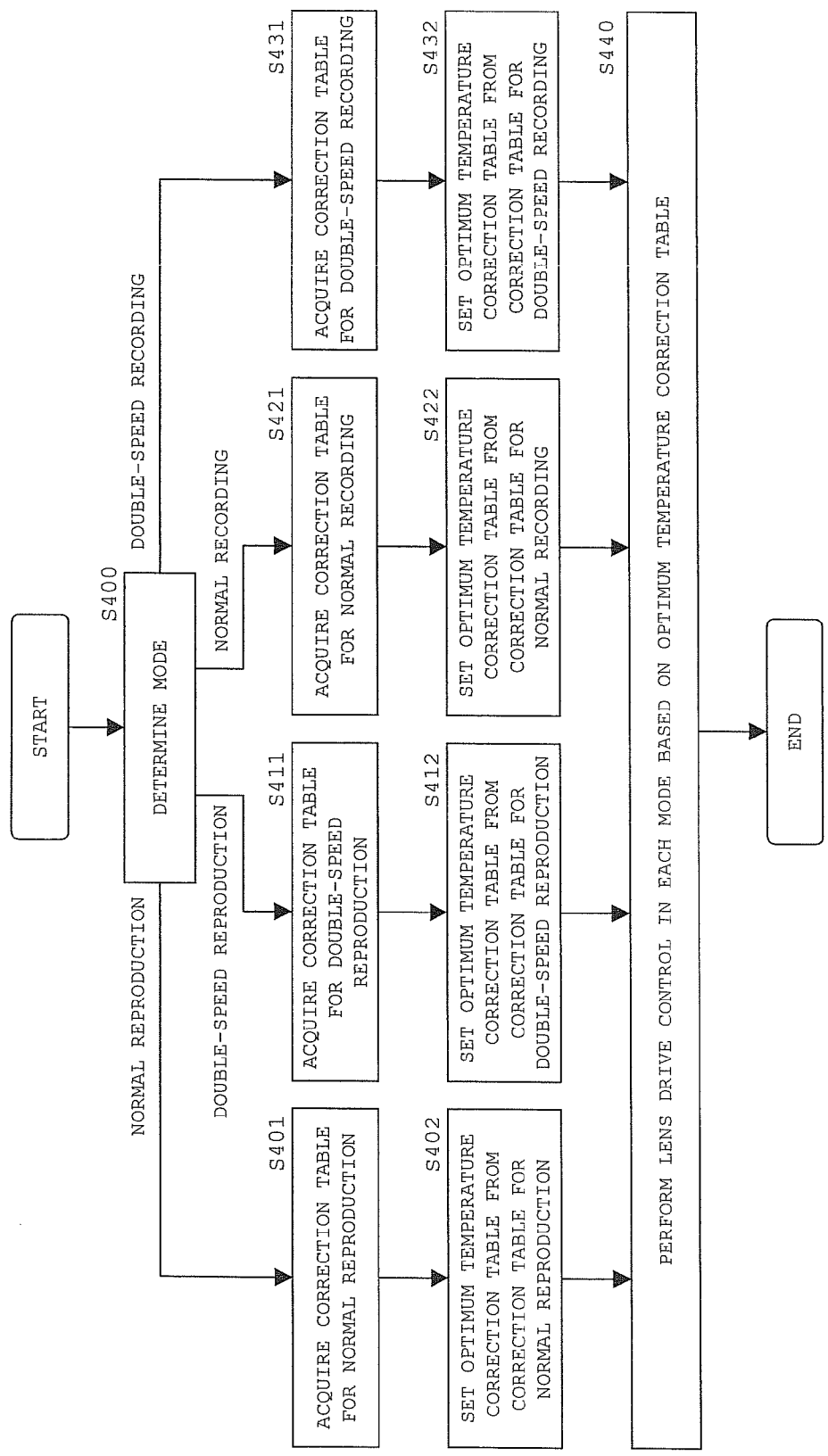
FIG. 13 is a flowchart in switching a temperature correction table according to an embodiment.

FIG. 13 shows a flowchart when the temperature correction tables are switched according to the operation mode. In the flowchart of FIG. 13, it is assumed that four operation modes of a normal reproduction mode, a double-speed reproduction mode, a normal recording mode, and a double-speed recording mode exists in the optical disk apparatus.

When an operation command is inputted, it is determined which of the normal reproduction mode, double-speed reproduction mode, normal recording mode, and double-speed recording mode is the inputted operation command (S400).

When the inputted operation mode is the normal reproduction mode, the servo circuit 12 acquires the reference temperature correction table for the normal reproduction from the built-in memory (S401), and the servo circuit 12 sets the optimum temperature correction table according to the flowchart of FIG. 6 (S402). In the setting process, the laser beam is emitted with a power in the normal reproduction mode.

When the inputted operation mode is the double-speed reproduction mode, the servo circuit 12 acquires the reference temperature correction table for the double-speed reproduction from the built-in memory (S411), and the servo circuit 12 sets the optimum temperature correction table according to the flowchart of FIG. 6 (S412). In the setting process, the laser beam is emitted with a power in the double-speed reproduction mode.

When the inputted operation mode is the normal recording mode, the servo circuit 12 acquires the reference temperature correction table for the normal recording from the built-in memory (S421), and the servo circuit 12 sets the optimum temperature correction table according to the flowchart of FIG. 6 (S422). In the setting process, the laser beam is emitted with a power in the normal recording mode.

When the inputted operation mode is the double-speed recording mode, the servo circuit 12 acquires the reference temperature correction table for the double-speed recording from the built-in memory (S431), and the servo circuit 12 sets the optimum temperature correction table according to the flowchart of FIG. 6 (S432). In the setting process, the laser beam is emitted with a power in the double-speed recording mode.

Thus, after the optimum temperature correction table is set, the operation of the corresponding mode is performed, the drive control of the collimator lens 104 is performed according to the flowchart of FIG. 7 based on the optimum temperature correction table (S440). At this point, the optimum temperature correction table is appropriately re-updated through the steps S206 to S208 of FIG. 7. Then, the control of FIG. 7 is ended in response to the operation end of each mode.

In the flowchart of FIG. 13, the reference temperature correction table is prepared in each operation mode. Alternatively, as described in the modification (A), the linear coefficient (gradient) is prepared in each operation mode, and the optimum temperature correction table used in each operation mode may be set and updated based on the linear coefficient. Alternatively, the optimum step amount to the actual temperature of each operation mode may be determined by the direct computation from the linear coefficient.

The fluctuation in optical characteristic due to the wavelength is generated in not only the objective lens made of the resin material but also the objective lens made of glass. Therefore, the modification can be applied to the objective lens made of glass. In the case of the objective lens made of glass, the position of the collimator lens may be controlled according only to the laser power.

(D) Storage of Reference Temperature Correction Table

In the above descriptions, the reference temperature correction table or linear coefficient (gradient) and the optimum step amount in the initial setting are stored in the servo circuit 12. Alternatively, the reference temperature correction table or linear coefficient (gradient) and the optimum step amount in the initial setting may be stored in a flash memory incorporated in the optical pickup 10, read by a system microcomputer on the optical disk apparatus side in the start-up of the optical disk apparatus (only in the initial start-up or every start-up), and set into the servo circuit 12.

Alternatively, the linear coefficient (gradient) and the optimum step amount in the initial setting are retained in a barcode adhering to a casing of the optical pickup 10 in shipping, and the barcode may be read in assembling the disk drive and registered as a constant of the microcomputer memory on the system side or the program. In addition to the barcode, the linear coefficient (gradient) and the optimum step amount in the initial setting may be retained using a two-dimensional code such as a QR code.

Because the different type of optical pickups 10 have the different reference temperature correction tables and coefficients (gradients) of the linear functions, it is necessary that information corresponding to the type of mounted optical pickup 10 be set in the servo circuit 12. As described above, when the information is read from the flash memory incorporated in the optical pickup 10 and set into the servo circuit 12, the different reference temperature correction table and coefficient (gradient) of the linear function can be set smoothly and surely into the servo circuit 12. In the case where the information is read from the barcode, the linear coefficient (gradient) can easily be registered in the microcomputer memory on the system side.

Thus, while the modifications of the embodiments are described, other modifications of the embodiments can also be made.

Figure 14B:
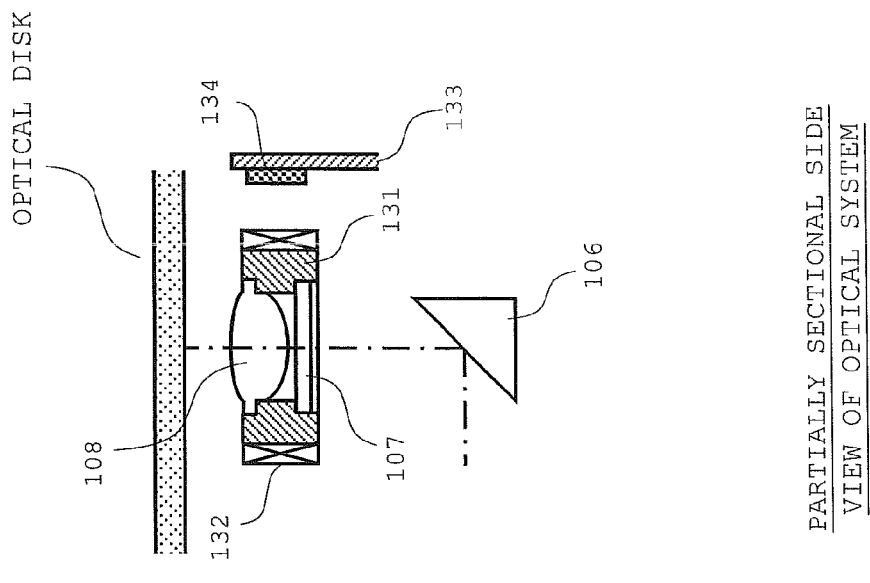
FIGS. 14A and 14B show a modification of the optical system of the optical pickup of the embodiment.
Figure 14A:
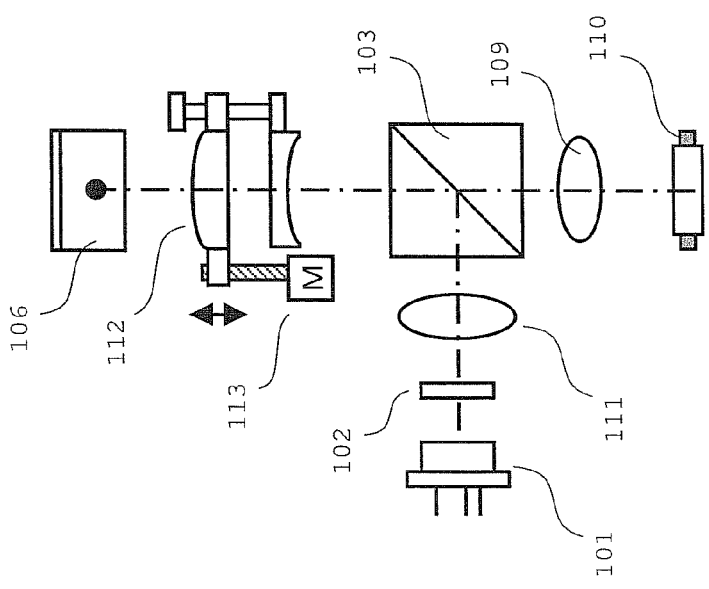

For example, the BD, DVD, and CD compatible type optical pickup is shown in the embodiments, and the present invention can be applied to an optical pickup dedicated to the BD. FIGS. 14A and 14B show a configuration of an optical system of the optical pickup dedicated to the BD. In FIGS. 14A and 14B, the same component as that of FIGS. 1A and 1B are designated by the same numeral.

In the configuration of FIGS. 14A and 14B, a collimator lens 111 is disposed between the semiconductor laser 101 and the polarization beam splitter 103. An expander 112 and a lens actuator 113 are disposed for the purpose of aberration correction. The expander 112 includes a convex lens and a concave lens. The lens actuator 113 drives the convex lens of the expander 112 in an optical axis direction. The drive control of the expander 112 is performed by the servo circuit 12 during the fluctuation in temperature of the objective lens 108.

Other optical elements such as a liquid crystal device can be used as the aberration correction element.

Although BD in the next-generation DVD is described in the embodiments, the present invention can appropriately be applied to the optical pickup and optical disk apparatus which are compatible with HDDVD (High-Definition Digital Versatile Disc) and other optical disks.

Although the objective lens made of the resin material is described in the embodiments, the present invention can appropriately be applied to the optical pickup and optical disk apparatus on which the objective lens made of glass is mounted. That is, in the case where the change in optical characteristic of the objective lens associated with the temperature change has the influence on the quality of the recording/reproduction characteristic, the present invention can be applied to not only the objective lens made of the resin material but also the objective lens made of glass.

Various changes and modifications can be made without departing from the scope of the technical thought shown in the appended claims of the present invention.

What is claimed is:

1. An optical disk apparatus comprising:
   an optical pickup device which includes:
   a laser source,
   an objective lens which causes a laser beam emitted from the laser source to converge onto an optical disk,
   a temperature sensor which detects a temperature of the objective lens,
   an optical element which corrects deterioration of an optical characteristic of the laser beam passing through the objective lens, and
   a photodetector which receives the laser beam reflected by the optical disk; and
   a control circuit which drives the optical element based on a detection signal from the temperature sensor, wherein the control circuit has a functional portion for defining a correlation between a detection signal of the temperature sensor and a proper drive amount of the optical element, and the control circuit performs drive control of the optical element based on the correlation defined by the functional portion and the detection signal from the temperature sensor, wherein the functional portion retains a reference table in which the detection signal of the temperature sensor and proper drive amount of the optical element are correlated with each other, wherein the functional portion detects the proper drive amount of the optical element based on a detection signal of the photodetector in driving the optical element, the functional portion updates the reference table based on the proper drive amount and the detection signal of the temperature sensor, and the control circuit performs drive control of the optical element based on the updated reference table and the detection signal of the temperature sensor.

2. The optical disk apparatus according to claim 1, wherein the functional portion re-updates the reference table based on the detection signal of the temperature sensor or the detection signal of the photodetector.

3. The optical disk apparatus according to claim 2, wherein the functional portion re-updates the reference table, when a change amount of the detection signal of the temperature sensor exceeds a threshold, or when quality of the detection signal of the photodetector is lower than a threshold.

4. The optical disk apparatus according to claim 2, wherein, during the re-update, the functional portion detects the proper drive amount of the optical element based on the detection signal of the photodetector when the optical element is driven, and the functional portion re-updates the reference table based on a linear function satisfying both the current proper drive amount and the current detection signal of the temperature sensor and the proper drive amount acquired in the previous update and the detection signal of the temperature sensor acquired in the previous update.

5. An optical disk apparatus comprising:
an optical pickup device which includes:
a laser source,
an objective lens which causes a laser beam emitted from the laser source to converge onto an optical disk,
a temperature sensor which detects a temperature of the objective lens,
an optical element which corrects deterioration of an optical characteristic of the laser beam passing through the objective lens, and
a photodetector which receives the laser beam reflected by the optical disk; and
a control circuit which drives the optical element based on a detection signal from the temperature sensor, wherein
the control circuit has a functional portion for defining a correlation between a detection signal of the temperature sensor and a proper drive amount of the optical element, and the control circuit performs drive control of the optical element based on the correlation defined by the functional portion and the detection signal from the temperature sensor, wherein
the functional portion retains a reference table in which the detection signal of the temperature sensor and proper drive amount of the optical element are correlated with each other,
wherein the functional portion retains a plurality of reference tables corresponding to operation modes, and drive control of the optical element is performed based on the reference table corresponding to actual operation, and
the operation modes are defined based on rotation speed of the disk.

6. An optical disk apparatus comprising:
an optical pickup device which includes:
a laser source,
an objective lens which causes a laser beam emitted from the laser source to converge onto an optical disk,
a temperature sensor which detects a temperature of the objective lens,
an optical element which corrects deterioration of an optical characteristic of the laser beam passing through the objective lens, and
a photodetector which receives the laser beam reflected by the optical disk; and
a control circuit which drives the optical element based on a detection signal from the temperature sensor, wherein
the control circuit has a functional portion for defining a correlation between a detection signal of the temperature sensor and a proper drive amount of the optical element, and the control circuit performs drive control of the optical element based on the correlation defined by the functional portion and the detection signal from the temperature sensor,
wherein the functional portion sets the proper drive amount of the optical element to the detection signal of the temperature sensor based on a linear function defining a relationship between the detection signal of the temperature sensor and the proper drive amount of the optical element, wherein
a plurality of correlation functions corresponding to operation mode are defined in the functional portion, and drive control of the optical element is performed based on the correlation function corresponding to actual operation, and
the operation modes are defined based on rotation speed of the disk.

7. The optical disk apparatus according to claim 6, wherein the functional portion retains a gradient of the linear function, the functional portion detects the proper drive amount of the optical element based on the detection signal of the photodetector when the optical element is driven, and the functional portion sets the proper drive amount of the optical element based on the linear function determined by the proper drive amount and the detection signal of the temperature sensor and the gradient.

8. The optical disk apparatus according to claim 6, wherein the functional portion updates the linear function based on the detection signal of the temperature sensor or the detection signal of the photodetector.

9. The optical disk apparatus according to claim 8, wherein the functional portion updates the linear function, when a change amount of the detection signal of the temperature sensor exceeds a threshold, or when quality of the detection signal of the photodetector is lower than a threshold.

10. The optical disk apparatus according to claim 8, wherein, during the update, the functional portion detects the proper drive amount of the optical element based on the detection signal of the photodetector when the optical element is driven, and the functional portion updates the linear function satisfying both the current proper drive amount and the current detection signal of the temperature sensor and the proper drive amount acquired in the previous update and the detection signal of the temperature sensor acquired in the previous update.

* * * * *